US012614133B2

(12) United States Patent
Zhang et al.

(10) Patent No.: US 12,614,133 B2
(45) Date of Patent: Apr. 28, 2026

(54) ADAPTIVE DERIVATION OF MEETING CONTENT

(71) Applicant: International Business Machines Corporation, Armonk, NY (US)

(72) Inventors: Li Bo Zhang, Beijing (CN); Zhuo Zhao, Beijing (CN); Yang Yang, Shanghai (CN); Na Lv, Beijing (CN); Guo Fang Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 18/783,656

(22) Filed: Jul. 25, 2024

(65) Prior Publication Data

US 2026/0030571 A1      Jan. 29, 2026

(51) Int. Cl.
*G06Q 10/0631*      (2023.01)
*G10L 17/02*      (2013.01)

(52) U.S. Cl.
CPC ...... *G06Q 10/063114* (2013.01); *G10L 17/02* (2013.01)

(58) Field of Classification Search
CPC ........................ G06Q 10/063114; G10L 17/02
USPC ........................................................ 705/3–44
See application file for complete search history.

(56) References Cited

U.S. PATENT DOCUMENTS 9,641,563 B1 *   5/2017   Kitada .................... H04N 7/152
11,095,468 B1 *   8/2021   Pandey ............... H04L 12/1831

2009/0319916 A1 *   12/2009   Gudipaty ................. H04N 7/15
                                                                          715/753
2014/0096036 A1 *   4/2014   Mohler .................. G06Q 10/10
                                                                          715/753
2015/0356312 A1 *   12/2015   Sato ..................... G06Q 10/101
                                                                          726/28
2017/0099361 A1 *   4/2017   Digilov ................. H04L 65/403
2018/0063480 A1 *   3/2018   Luks ...................... H04N 7/147
2018/0101281 A1 *   4/2018   Nelson ................... G06N 5/022
(Continued)

FOREIGN PATENT DOCUMENTS

EP           3486829 A1 *   5/2019   ......... G06F 21/6245
GB           2507868 A  *   5/2014   ........... H04L 65/403
WO   WO-2009102557 A1 *   8/2009   ........... H04L 65/765

OTHER PUBLICATIONS

Elizabeth "Learning Dynamic Time Preferences in Multi-Agent Meeting Scheduling", Jul. 2005, School of Computer Science Carnegie Mellon University, pp. 1-14 (Year: 2005).*
(Continued)

*Primary Examiner* — Romain Jeanty
(74) *Attorney, Agent, or Firm* — Monchai Chuaychoo

(57) ABSTRACT

A computer-implemented method, a system and a computer program product for adaptive derivation of meeting content is provided. In the method, for a meeting held for a program, a current phase can be determined from a plurality of phases of the program. A speaker can be detected in the meeting from a plurality of participants of the program. Meeting content associated with the meeting can be obtained based on analyzing input data from the speaker. A file can be activated based on the current phase, the meeting content and a phase context profile model which is trained with history data associated with past meetings held for the program in terms of file inputs. Then, the file can be updated based on the meeting content.

17 Claims, 9 Drawing Sheets

(56)     References Cited

U.S. PATENT DOCUMENTS

| | | | |
|---|---|---|---|
| 2018/0101824 A1* | 4/2018 | Nelson | H04L 12/1831 |
| 2019/0108493 A1 | 4/2019 | Nelson et al. | |
| 2020/0389334 A1* | 12/2020 | Kochura | H04L 12/1831 |
| 2021/0092168 A1 | 3/2021 | Ranalli et al. | |
| 2021/0399911 A1* | 12/2021 | Jorasch | H04L 12/1818 |
| 2022/0272132 A1 | 8/2022 | Ahmed et al. | |
| 2022/0385758 A1* | 12/2022 | Tadesse | G10L 25/51 |
| 2025/0095328 A1 | 3/2025 | Zhang et al. | |

OTHER PUBLICATIONS

Joseph et al "Improving Team's Consistency of Understanding in Meetings", Oct. 2016, IEEE Transactions On Human-Machine Systems, vol. 46, No. 5, pp. 625-637 (Year: 2016).*
Disclosed Anonymously, "Controlled and Contextual Information Delivery Within a Collaboration Session Tailored for a Plurality of Users", IP.com No. IPCOM000268942D, IP.com Electronic Publication Date: Mar. 10, 2022, 8 pages, https://priorart.ip.com/IPCOM/000268942.
Flemomtomos et al., "Combined Speaker Clustering and Role Recognition in Conversational Speech", Department of Electrical Engineering, University of Southern California, Los Angeles, CA, USA , Published Date: Sep. 2018, 5 pages, https://nikosfl.github.io/work/papers/2018_IS_SpeakerClustering.pdf.

* cited by examiner

100

200

MEETING CONTENT
PROCESSING SYSTEM
210

MEETING SYSTEM 220

USER DEVICE(S) 230

Figure 3:
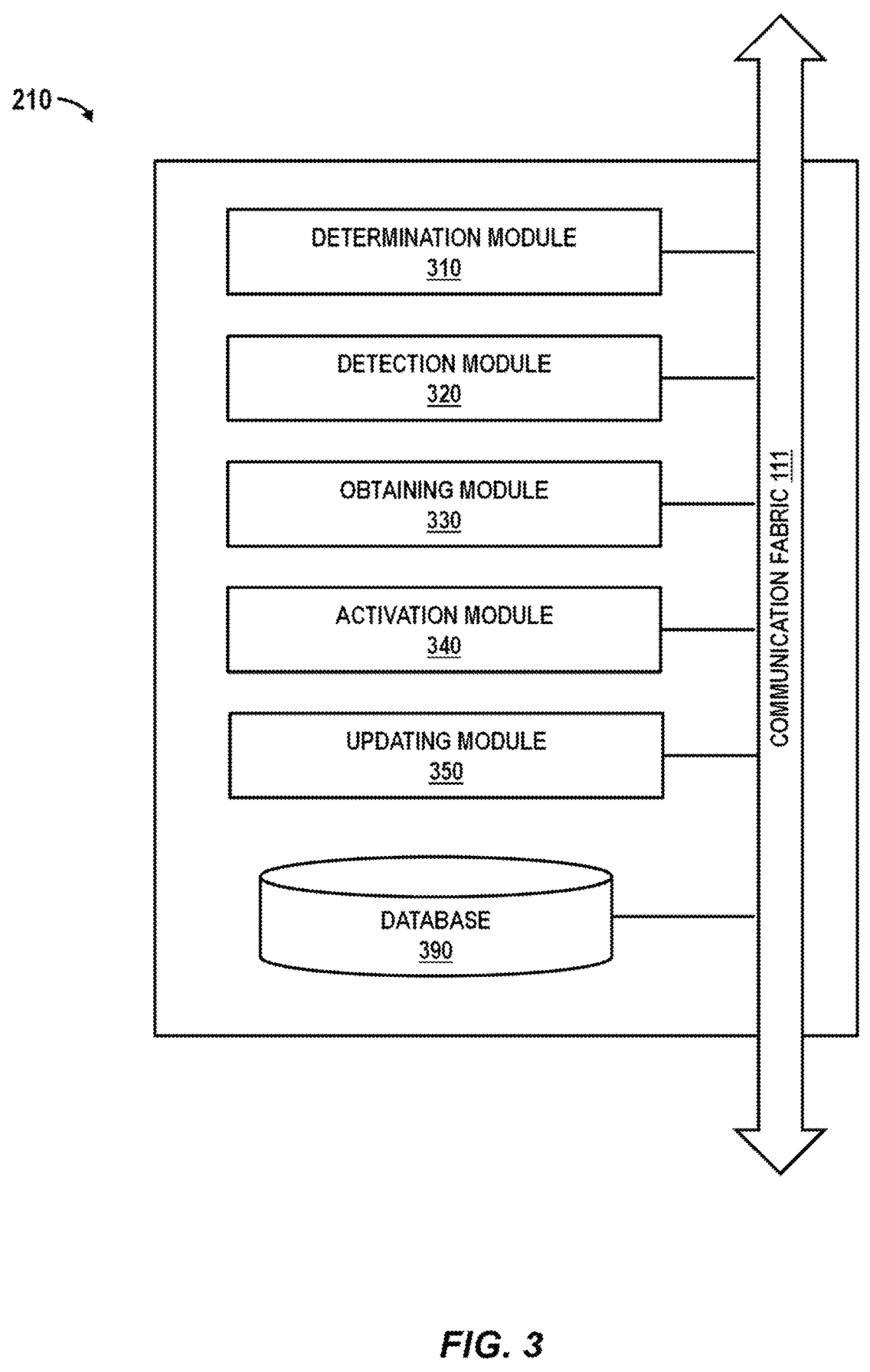

DETERMINATION MODULE
310

DETECTION MODULE
320

OBTAINING MODULE
330

ACTIVATION MODULE
340

UPDATING MODULE
350

DATABASE
390

COMMUNICATION FABRIC 111

600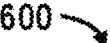

```
┌─────────────────────────────┐
│  ┌─────────────────────────┐│        ┌──────────────────────────────────┐
│  │   VIDEO TRANSCRIPTS     ││        │                                  │
│  └─────────────────────────┘│        │   ┌──────────────────────────┐   │
│  ┌─────────────────────────┐│───────▶│   │   METADATA ANALYZER      │   │
│  │    AUDIO SCRIPTS        ││        │   │        610               │   │
│  └─────────────────────────┘│        │   └──────────────────────────┘   │
│  ┌─────────────────────────┐│        │               │                  │
│  │    EDITED FILES         ││        │               ▼                  │
│  └─────────────────────────┘│        │   ┌──────────────────────────┐   │
│  ┌─────────────────────────┐│        │   │  CONTEXT EXTRACTOR 620   │   │
│  │    RELATED TOPICS       ││        │   └──────────────────────────┘   │
│  └─────────────────────────┘│        │               │                  │
└─────────────────────────────┘        │               ▼                  │
                                       │   ┌──────────────────────────┐   │
                                       │   │   DOMAIN CLUSTER 630     │   │
                                       │   └──────────────────────────┘   │
┌─────────────────────────────┐        │               │                  │
│    OBTAIN ROLE MAP 650      │        │               ▼                  │
└─────────────────────────────┘        │   ┌──────────────────────────┐   │
             │                         │   │   RELATIONSHIP           │   │
             │                         │   │   DISCOVER UNIT 640      │   │
             │                         │   └──────────────────────────┘   │
             │                         │                          601     │
             │                         └──────────────────────────────────┘
             │                                         │
             ▼                                         ▼
┌─────────────────────────────────────────────────────────────────┐
│                   UPDATE ROLE MAP 660                           │
└─────────────────────────────────────────────────────────────────┘
```

*FIG. 6*

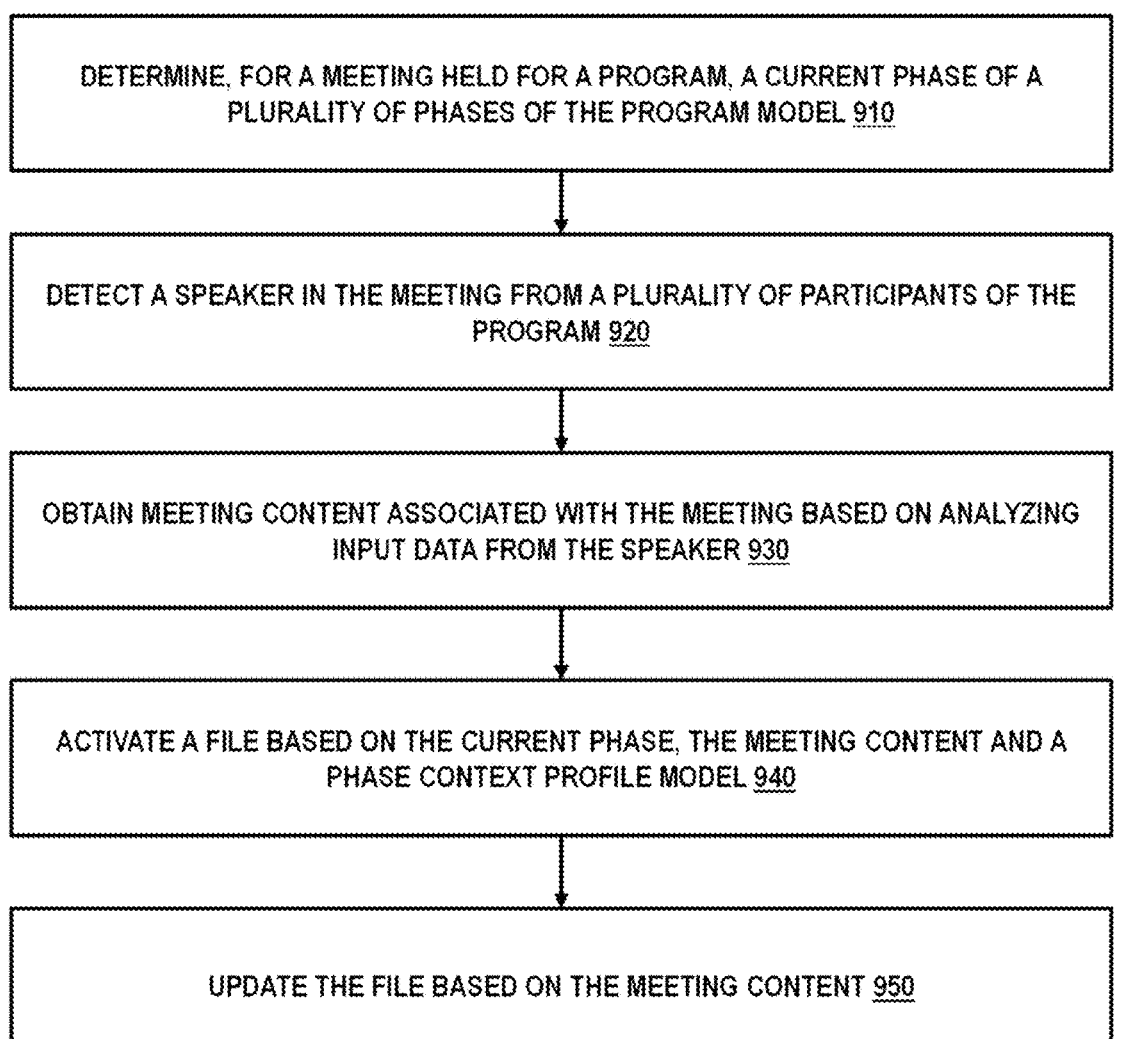

DETERMINE, FOR A MEETING HELD FOR A PROGRAM, A CURRENT PHASE OF A PLURALITY OF PHASES OF THE PROGRAM MODEL 910

DETECT A SPEAKER IN THE MEETING FROM A PLURALITY OF PARTICIPANTS OF THE PROGRAM 920

OBTAIN MEETING CONTENT ASSOCIATED WITH THE MEETING BASED ON ANALYZING INPUT DATA FROM THE SPEAKER 930

ACTIVATE A FILE BASED ON THE CURRENT PHASE, THE MEETING CONTENT AND A PHASE CONTEXT PROFILE MODEL 940

UPDATE THE FILE BASED ON THE MEETING CONTENT 950

*FIG. 9*

ADAPTIVE DERIVATION OF MEETING CONTENT

BACKGROUND

The present invention relates to data processing, and more specifically, to adaptive derivation of meeting content.

Generally, a large-scale program may have fixed patterns, which may comprise a plurality of regular phases. For example, the entire process of the Olympic Games may be defined as six phases, including: bidding, foundation, planning, preparation, competition, and post-game. The respective phases may have corresponding durations for achieving different goals. Periodic meetings need to be scheduled in the respective phases. For such kind of multi-party cooperation, large-scale online meetings are often required.

The online meetings have a plurality of advantages, such as no restriction on time and site, lower cost, improved communication efficiency, suitability for different activities (such as, technical seminar, national wide party, customer workshop, design thinking, and other complex programs). The efficiency of online meetings determines the quality and speed of the output thereof.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to an aspect of the present invention, there is provided a computer-implemented method for adaptive derivation of meeting content. In the method, for a meeting held for a program, a current phase can be determined from a plurality of phases of the program. A speaker can be detected in the meeting from a plurality of participants of the program. Meeting content associated with the meeting can be obtained based on analyzing input data from the speaker. A file can be activated based on the current phase, the meeting content and a phase context profile model which is trained with history data associated with past meetings held for the program in terms of file inputs. Then, the file can be updated based on the meeting content. Therefore, the meeting content can be derived efficiently, avoiding the participants in meeting from losing a track to the meeting content.

According to an aspect of the present invention, there is provided a system for adaptive derivation of meeting content. The system may comprise one or more processors, a memory coupled to at least one of the one or more processors, and a set of computer program instructions stored in the memory. The set of computer program instructions may be executed by at least one of one or more processors to perform the above methods.

According to an aspect of the present invention, there is provided a computer program product for adaptive derivation of meeting content. The computer program product may comprise a computer readable storage medium having program instructions embodied therewith. The program instructions executable by one or more processors causes the one or more processors to perform the above methods.

In addition to the exemplary aspects and embodiments described above, further aspects and embodiments will become apparent by reference to the drawings and by study of the following descriptions.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 shows an exemplary implementation environment for an exemplary meeting content processing system according to some embodiments of the present disclosure;

FIG. 3 shows a block diagram illustrating an exemplary system for adaptive derivation of meeting content according to embodiments of the present disclosure;

FIG. 6 shows an illustrative diagram of an illustrative process for updating a role map according to embodiments of the present disclosure;

FIG. 9 shows a flowchart illustrating a computer-implemented method for adaptive derivation of meeting content according to embodiments of the present disclosure.

DETAILED DESCRIPTION

Figure 1:
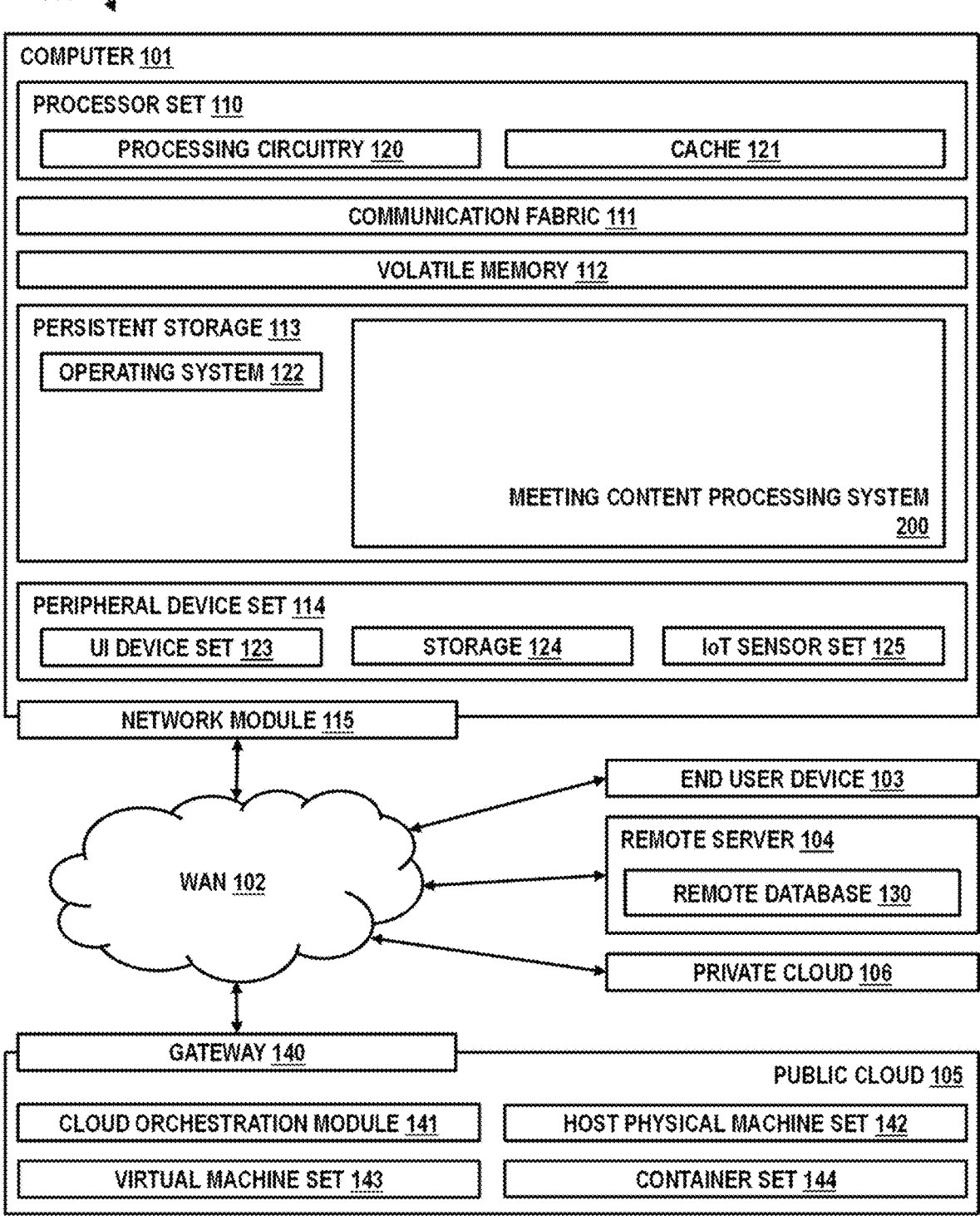
FIG. 1 shows an exemplary computing environment which is applicable to implement the embodiments of the present disclosure.

A computer-implemented method for providing an adaptive derivation of meeting content. A computer determines a meeting held for a program, a current phase of a plurality of phases of the program. A computer detects a speaker in the meeting from a plurality of participants of the program. A computer obtains a meeting content associated with the meeting based on analyzing input data from the speaker. A computer activates a file based on the current phase, the meeting content and a phase context profile model, which is trained with history data associated with past meetings held for the program in terms of file inputs. A computer updates the file based on the meeting content. As a result, the meeting content can be derived efficiently, avoiding the participants in meeting from losing a track to the meeting content.

The computer, where the current phase is determined by performing the phase context profile model based on at least one of the followings, program regular meeting agendas, program timelines, the input data from the speaker and the meeting contents. Therefore, by utilizing the modelling method, an adaptive phase-sensitive derivation can be accurately and efficiently implemented.

The computer can update the file based on configuring an indicator to a data unit associated with the task in the file to indicate a status of the task based on the relationship between the task and the blocking issue. Therefore, important information of the meeting can be obtained efficiently and indicated automatically in the corresponding file.

The computer contains an indicator that is configured by sending an add reference event or a change reference event for the data unit via a companion reference model for managing reference data of the file.

The computer contains the meeting content, and the meeting content can indicate that a status of a task should be updated by a first participant of the plurality of participants who is absent from the meeting. For example, the computer that updates the file based on the meeting content can include, the computer retrieving information related to the task from history data associated with a previous meeting in which the first participant talked about the task and in response to retrieving the information related to the task, the computer can configure an indicator to a data unit associated with the task in the file to indicate the status of the task based on the retrieved information. Therefore, important information of the meeting can be obtained efficiently and can be analyzed in combination with history data, such that the corresponding file can be updated automatically.

The computer when it is unable to retrieve the information related to the task and the updating the file based on the meeting content, the computer can determine a second participant of the plurality of participants based on a relationship among the plurality of participants. Furthermore, the computer can cause the second participant to provide information related to the task and the computer can receive the information related to the task from the second participant and the computer can configure can indicator to a data unit associated with the task in the file to indicate the status of the task based on the received information related to the task from the second participant. Therefore, an appropriate alternative speaker can be automatically determined for an absentee to update the status of the task, improving the meeting efficiency.

The relationship among the plurality of participants for the current phase is indicated by a role map which is generated by performing the phase context profile model. Therefore, the efficiency of the meeting can be improved, as the relationship of the participants is clear.

The meeting content indicates a relationship among at least some of the plurality of participants with respect to a topic of a speech of the speaker. The role map is updated via a work collaboration model trained with history data associated with past meetings held for the program and the input data in terms of roles and topics, based on the relationship among the at least some of the plurality of participants with respect to the topic of the speech of the speaker. Therefore, the role map can be automatically corrected with the topic changing, correctly reflecting the corresponding relationships.

The phase context profile for the current phase is determined based on the phase context profile model. The file is activated further based on the phase context profile. Therefore, the activation process can be efficiently improved.

The computer may update the phase context profile model based on the input data from the respective speakers in the meeting. Therefore, unsupervised collaborative result fusion can be achieved by adaptive phase-sensitive derivation, improving the efficiency of multi-role online meeting.

A computer system for providing an adaptive derivation of meeting content comprises a processing circuit, a memory coupled to the processing circuit and a set of computer program instructions stored in the memory and the processing circuit executes the computer program instructions. The computer system determines for a meeting held for a program, a current phase of a plurality of phases of the program and detects a speaker in the meeting from a plurality of participants of the program. The computer system obtains meeting content associated with the meeting based on analyzing input data from the speaker and activates a file based on the current phase, where the meeting content and a phase context profile model, which is trained with history data associated with past meetings held for the program in terms of file inputs. The computer system updates the file based on the meeting content. As a result, the meeting content can be derived efficiently, avoiding the participants in meeting from losing a track to the meeting content.

The computer system can determine the current phase by performing the phase context profile model based on at least one of the followings, program regular meeting agendas, program timelines, the input data from the speaker and the meeting contents. Therefore, by utilizing the modelling method, an adaptive phase-sensitive derivation can be accurately and efficiently implemented.

The computer system, where the meeting content indicates a relationship between a task and a blocking issue; where the updating the file based on the meeting content comprises, the computer system configures an indicator to a data unit associated with the task in the file to indicate a status of the task based on the relationship between the task and the blocking issue. Therefore, important information of the meeting can be obtained efficiently and indicated automatically in the corresponding file.

The computer system, where the indicator is configured by sending an add reference event or a change reference event to the data unit via a companion reference model for managing reference data of the file.

The computer system, where the meeting content indicates that a status of a task should be updated by a first participant of the plurality of participants who is absent from the meeting and where the updating the file based on the meeting content. The computer system retrieves, information related to the task from history data associated with a previous meeting in which the first participant talked about the task and in response to retrieving the information related to the task, configuring, by the processing circuit, an indicator to a data unit associated with the task in the file to indicate the status of the task based on the retrieved information. Therefore, important information of the meeting can be obtained efficiently and can be analyzed in combination with history data, such that the corresponding file can be updated automatically.

The computer system, where in response to not retrieving the information related to the task, the updating the file based on the meeting content further comprises the computer system determines a second participant of the plurality of participants based on a relationship among the plurality of participants and the computer system causes the second participant to provide information related to the task and the computer system receives the information related to the task from the second participant. The computer system configures an indicator to a data unit associated with the task in the file to indicate the status of the task based on the received information related to the task from the second participant.

The computer system, where a relationship among the plurality of participants for the current phase is indicated by a role map which is generated by performing the phase context profile model and where the meeting content indicates a relationship among at least some of the plurality of participants with respect to a topic of a speech of the speaker and where the role map is updated via a work collaboration model trained with history data associated with past meetings held for the program and the input data in terms of roles and topics, based on the relationship among the at least some of the plurality of participants with respect to the topic of the speech of the speaker. Therefore, the role map can be automatically corrected with the topic changing, correctly reflecting the corresponding relationships.

A computer program product for providing an adaptive derivation of meeting content comprises of a computer-readable storage medium having program instructions embodied therewith, the program instructions executable by a computer. A computer determines for a meeting held for a program, a current phase of a plurality of phases of the program. A computer detects a speaker in the meeting from a plurality of participants of the program. A computer obtains a meeting content associated with the meeting based on analyzing input data from the speaker. A computer activates a file based on the current phase, the meeting content and a phase context profile model, which is trained with history data associated with past meetings held for the program in terms of file inputs. A computer updates the file based on the meeting content. As a result, the meeting content can be derived efficiently, avoiding the participants in meeting from losing a track to the meeting content.

The computer where the meeting content indicates a relationship between a task and a blocking issue and where the updating the file based on the meeting content comprises of a computer that can configure an indicator to a data unit associated with the task in the file to indicate a status of the task based on the relationship between the task and the blocking issue. Therefore, important information of the meeting can be obtained efficiently and indicated automatically in the corresponding file.

The computer where a relationship among the plurality of participants for the current phase is indicated by a role map which is generated by performing the phase context profile model and where the meeting content indicates a relationship among at least some of the plurality of participants with respect to a topic of a speech of the speaker and where the role map is updated via a work collaboration model trained with history data associated with past meetings held for the program and the input data in terms of roles and topics, based on the relationship among the at least some of the plurality of participants with respect to the topic of the speech of the speaker. Therefore, the role map can be automatically corrected with the topic changing, correctly reflecting the corresponding relationships.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a meeting content processing system 200. In addition to block 200 (i.e., meeting content processing system), computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

It is understood that the computing environment 100 in FIG. 1 is only provided for illustration purpose without suggesting any limitation to any embodiment of this invention, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

Generally, large-scale programs have repeated workflow, regular topics, dozens of attendees/participants with different roles. However, the large-scale programs may face variety of challenges. Due to the large number of participants, a lot of tracking content has no clue to be updated or closed. Because the interrelationship of participant roles is not clear, event tracking is not very continuous and can easily be missed. There are usually a lot of status documents that need to be updated and maintained, but there may be no efficient collaboration during the meeting. Due to the misalignment of the personnel vacation period and the rotation period of meeting content, updates of the meeting content of the upper and lower meeting series are interrupted. In the final analysis, all meetings need to reach a consensus. This process may include narration, question and answer, technical debate, and co-creation, etc. The extraction and review of effective information is the ultimate requirement for all meetings.

Embodiments of the present disclosure provide a computer-implemented method, a system and a computer program product for adaptive derivation of meeting content. Based on adaptive phase-sensitive derivation, unsupervised collaborative result fusion can be achieved for the meeting.

Figure 2:
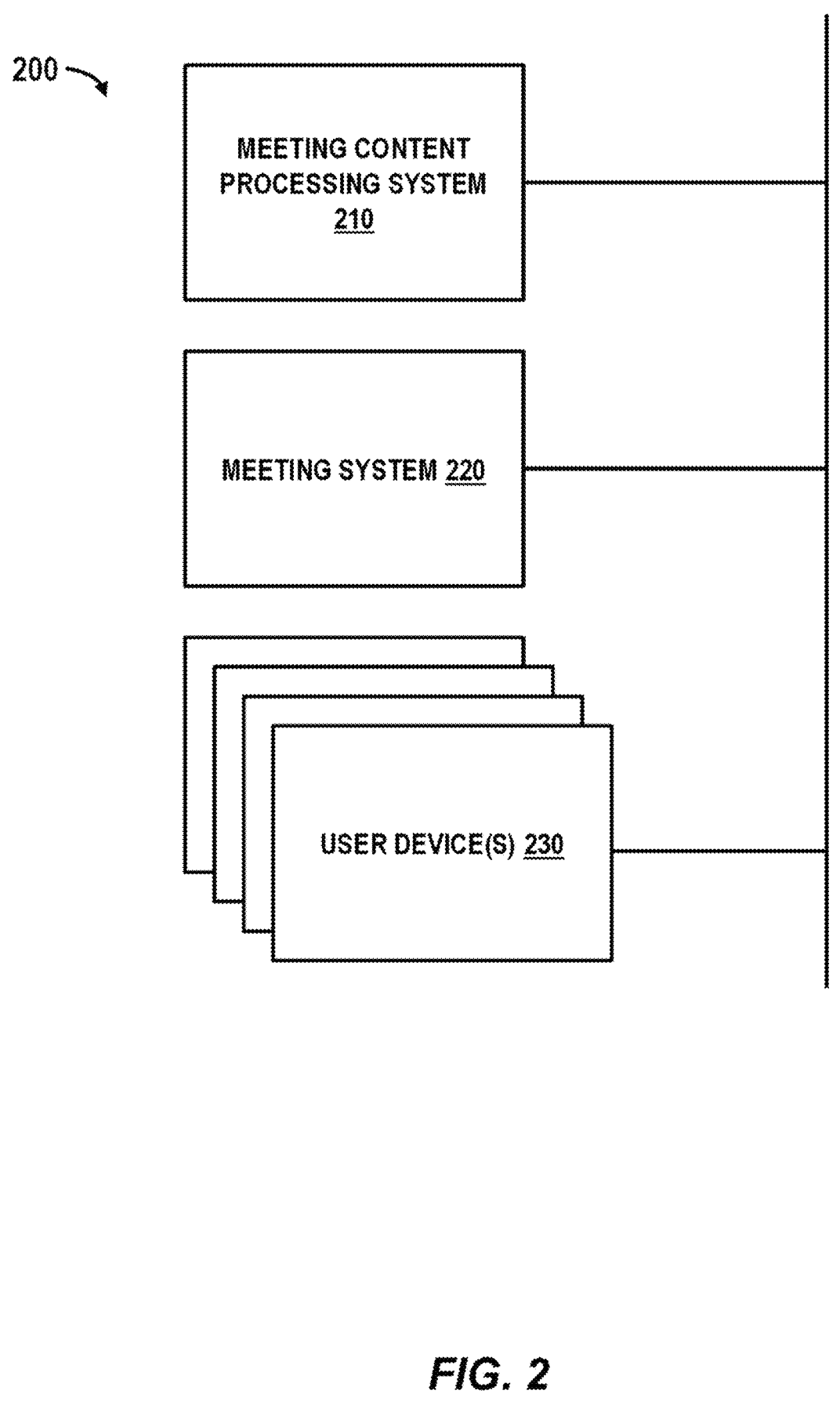

FIG. 2 depicts an exemplary implementation environment 200 according to some embodiments of the present disclosure. In the implementation environment 200, a system for adaptive derivation of meeting content, also referred to as a meeting content processing system 210 can be coupled to a meeting system 220 and multiple user devices 230 via a variety of communication buses.

In some embodiments, the meeting content processing system 210 can provide services to the meeting system 220 and the respective user devices 230. It should be noted that the processing of the meeting content processing system 210 according to embodiments of this disclosure could be implemented in the computing environment of FIG. 1, for example, with the computer 101.

The meeting system 220 may be a web conference system known in the art. The respective user devices 230 can be utilized by a single user or a group of users (e.g., in a meeting room) who share a common access. Thus, a large number of users in same or different locations can attend a meeting concurrently via their user devices. The number of user devices shown in FIG. 2 is only for illustrative purposes, while other number of user devices can be arranged according to actual situation.

Though the meeting content processing system 210 is shown as separate from the meeting system 220 in FIG. 2, other arrangements can also be implemented according to embodiments of the present disclosure. In an alternative embodiment, the meeting content processing system 210 may be incorporated into the meeting system 220.

In some embodiments, the meeting content processing system 210 can implement adaptive phase-sensitive derivation of meeting content of a meeting based on a phase context profile model. Based on the meeting content, a related file can be automatically updated, facilitating an efficient collaboration during the meeting. Details of the meeting content processing system 210 will be discussed in combination with the following figures.

With reference now to FIG. 3, a block diagram is provided illustrating the exemplary meeting content processing system 210, according to some embodiments of the present disclosure. In some embodiments, the meeting content processing system 210 can be configured to perform adaptive derivation of meeting content of a meeting held for a program. The program can be a large-scale program with a plurality of regular phases. Periodic meetings can be scheduled with respect to different topics and tasks in the respective phases.

As depicted in FIG. 3, in some embodiments, the meeting content processing system 210 includes a determination module 310, a detection module 320, an obtaining module 330, an activation module 340, an updating module 350 and a database 390. All, or some, of these can communicate with each other, for example, via a communication bus, such as the communication fabric 111 in FIG. 1. Any of these modules 310-360 may be implemented using a computing device, such as the processing circuitry 120 in FIG. 1 (e.g., by configuring the processing circuitry 120 to perform functions described for that module). The database 390 may be implemented with a memory, such as the volatile memory 112, a storage, such as the storage 124 as shown in FIG. 1, or the like. Further each of these modules 310-360 may be implemented as a single module, combined into other module, or further subdivided into multiple components. Other components not pertinent to example embodiments can also be included but are not shown.

In some embodiments, the determination module 310 determines, for a meeting held for a program, a current phase of the plurality of phases of the program. In another word, the current phase is the phase of the program that the meeting in progress is currently in.

In an instance, the current phase may be determined by utilizing natural language processing based on program regular meeting agendas, program timelines, and/or the like, of the program or one or more similar programs.

In an embodiment, the determination module 310 can determine, by utilizing natural language processing, that the program may have a number of regular phases and the corresponding durations of the respective phases based on program regular meeting agendas, program timelines, and/or the like, of the program or one or more similar programs. As an example, a program may have four phases, such as, a starting phase, a working phase, a reviewing phase and a conclusion phase, each of them having the corresponding durations for performing different tasks and achieving different goals. Based on a date-time stamp associated with the meeting in progress, the determination module 310 can deduce which of the phases is the current phase.

In another instance, the current phase may be determined by performing a phase context profile model, which may be generated with history data associated with past meetings held for the program (or additionally at least one similar program), for example, in terms of roles, topics, file inputs, and or the like. In an embodiment, the phase context profile model can be configured to determine the current phase based on the current time (for example, form a current date-time stamp) of the meeting, program information (such as, program regular meeting agendas, program timelines), input data from a speaker in the meeting, meeting contents, and/or the like.

Figure 4:
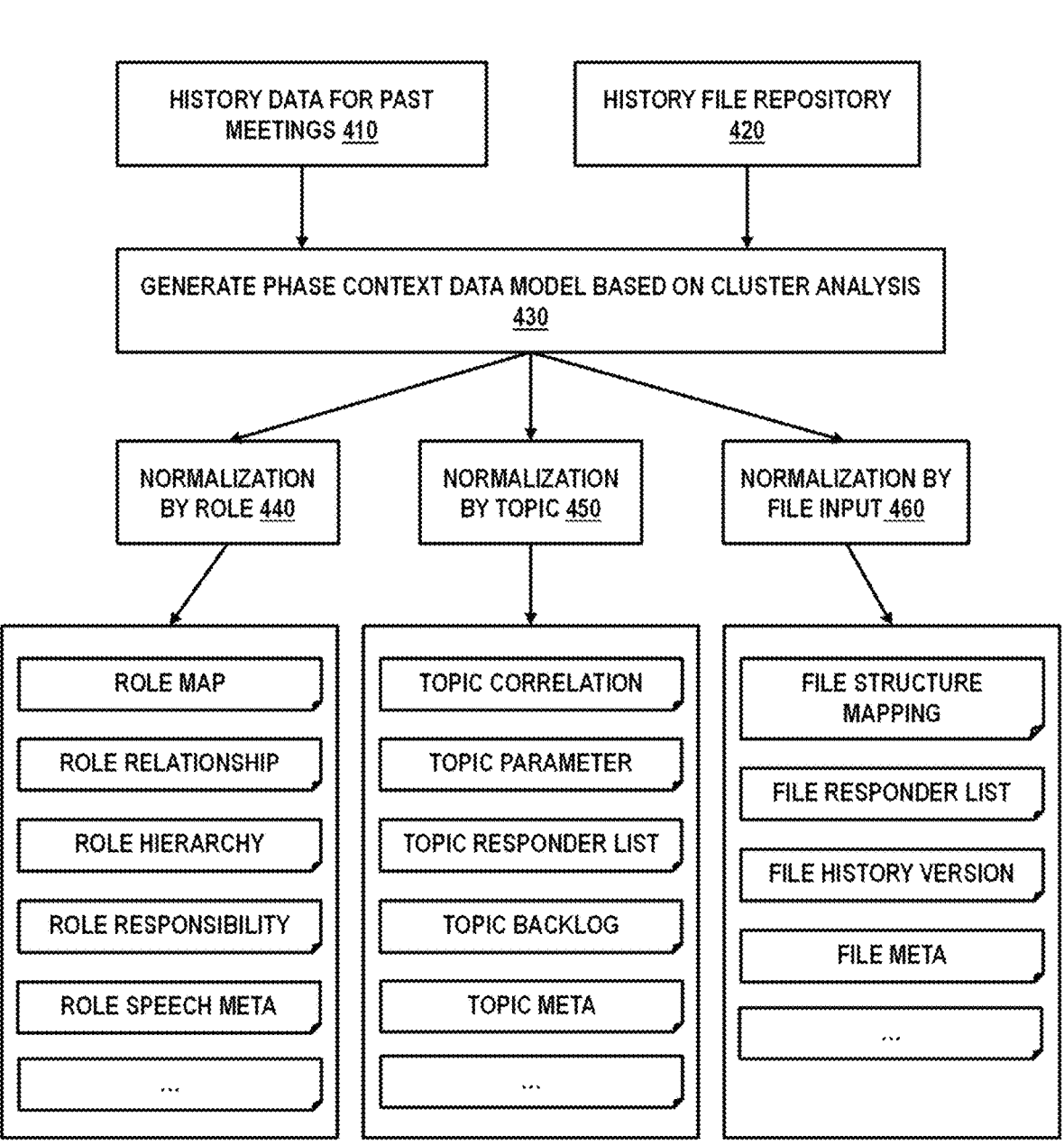
FIG. 4 shows a schematic diagram illustrating an illustrative process for training a phase context profile model according to embodiments of the present disclosure.

FIG. 4 depicts a schematic diagram illustrating a model generation process 400 for the phase context profile model according to an illustrative embodiment of the present disclosure. For example, the phase context profile model may be constructed by a computing device based on unsupervised cluster analysis. It can be noted that, the phase context profile model can also be generated based on other techniques, such as supervised analysis, semi-supervised analysis.

As shown in FIG. 4, the computing device may obtain history data for past meetings held for the same or similar program 410 and history file repository associated with past meetings 420 as input. For example, the history data may comprise video transcripts, audio scripts, edited files, involved topics, program plans, change management plans, and/or the like. The history file repository may comprise file/document locations, artifact locations, and/or the like. Then, at block 430, the computing device may create the phase context profile model based on performing a clustering analysis (data-oriented clustering) on the obtained history data and history file repository.

Then, the computing device may perform normalization process on the respective clusters in terms of roles, topics and file inputs respectively, to output contexts related to role, topic, and file input for the respective phases. For example, after normalization by roles 440, the phase context profile model may output role relationships (i.e., relationships of the participants), a role map (which indicates relationships of the participants), role hierarchy (which indicates hierarchy of the participants), role responsibility (which indicates the responsibility of the respective participants), role speech meta (metadata of speech of the respective participants), and/or the like, each of them having a phase parameter (e.g., a phase-context-indicator). After normalization by topics 450, the phase context profile model may output topic correlation, topic parameters, topic responder lists, topic backlog, topic meta, and/or the like, each of them having a phase parameter (e.g., a phase-context-indicator). After normalization by file input 460, the phase context profile model may output file structure mappings, file responder lists, file history versions, file meta, and/or the like, each of them having a phase parameter (e.g., a phase-context-indicator). The phase parameter may indicate the corresponding phase of the program. Therefore, the phase context profile model can be generated in terms of the roles, the topics or the file inputs, specific to the respective phases of the program.

Therefore, the determination module 310 may determine the current phase based on the current time of the meeting, the program information (such as, program regular meeting agendas, program timelines), and/or the like, via the phase context profile model, by utilizing natural language processing. For example, by comparing the current time of the meeting with time information from metadata (such as, the role speech meta, the topic meta, the file meta), the current phase can be determined based on the corresponding phase parameter from the role speech meta, the topic meta, the file meta, and/or the like.

In an embodiment, a phase context profile may be generated via the phase context profile model, for example, based on the metadata (such as, the role speech meta, the topic meta, the file meta). For example, with the phase context profile model, the metadata can be obtained by performing data-oriented clustering on the history data (for example, video transcripts, audio scripts, edited files, involved topics, program plans, change management plans) in terms of roles, topics and/or file inputs.

As an example, the metadata can be formatted in a data structure. Case 1 is an exemplary data structure of part of the metadata associated with Role 1. The metadata in Case 1 may comprise the information related to working time duration, working phases, assigned topics/tasks, co-workers, edited files, status of topics/tasks, and/or the like.

Case 1:

Role 1

In an embodiment, the determination module 310 may determine the current phase based on the current time of the meeting, the program information (such as, program regular meeting agendas, program timelines), and/or the like, in combination with the metadata. For example, if the metadata indicates the program have a first phase (2022 Feb. 23~2022 Jul. 26), a second phase (2022 Aug. 5~2022 Nov. 16), a third phase (2022 Nov. 18~2023 Mar. 23), and a fourth phase (2023 Apr. 23~2023 Sep. 26) and the meeting time is 2023 May 8, the determination module 310 may determine the current phase is in the fourth phase.

Further, the phase context profile for the respective phase can be generated based on the metadata. An exemplary phase context profile for a phase X of a program can be provided as Case 2. In Case 2, the phase context profile describes information associated with the participant role 12, topic 5 and file input 5 respectively, for brief description. For example, in case 2, for the role part, a description, a responsibility, working time duration, relationships (for example, co-workers), involved topics, working phases, edited files and documents, and/or the like, of the respective roles can be provided. For the topic part, a description, an involved duration, a topic ID, assigned tasks, keywords, involved phases, involved roles/participants, and/or the like, of the respective topics can be provided. For the input part, an edited duration, involved phases, related files, involved roles/participants, input keywords, and/or the like, of the respective input files can be provided.

Case 2:

| Phase X |
| --- |
| {<br>role{<br>    role_12{description; responsibility, duration, {relationship1;<br>    relationship2; ...},<br>    {topic1, topic2,...}, {phase2,...}, {file4, doc2...}...};<br>    ...<br>    },<br>topic{<br>    topic_5{description; ID; duration, {task1, task2...}; {keyword1,<br>    keyword2...};<br>    {phase2,...}, {role_11, role_18...}...};<br>    ...},<br>input{<br>    input_5{duration, {phase2...}, {file1, file3,...}, {role_2,<br>    role_12,...},<br>    {inputkeyword1, inputkeyword2,...}...};<br>    ...},<br>} |

In some embodiments, the phase context profile can be then used to activate a corresponding file by the activation module 340. Details will be described below. Further, the phase context profile model and/or the phase context profiles generated for the respective phases can be stored in the database 390.

| Time duration | Phase | Topic | Co-worker | File | Status of topic/task |
| --- | --- | --- | --- | --- | --- |
| 2022 Week 1 | Phase 1 | Topic_x | Role_a | Doc_11 | status_topic_x_50%_complete |
| 2022 Week 2 | Phase 1 | Topic_x | Role_a | Doc_11 | status_topic_x_60%_complete |
| 2022 Week 3 | Phase 1 | Topic_x | Role_b | Doc_21 | status_topic_x_90%_complete |
| 2022 Week 4 | Phase 2 | Topic_y | Role_c | Doc_31 | status_topic_y_30%_complete |
| 2022 Week 5 | Phase 2 | Topic_y | Role_c | Doc_31 | status_topic_y_70%_complete |
| 2022 Week 6 | Phase 2 | Topic_z | Role_d | Doc_41 | status_topic_z_90%_complete |
| . . . | . . . | . . . | . . . | . . . | . . . |

Moreover, the determination module 310 may further determine or ensure the current phase via the phase context profile model based on the input data from the respective speakers in the meeting, and meeting contents in combination with the detection module 320 and/or the obtaining module 330.

In some embodiments, the detection module 320 detects a speaker in the meeting from a plurality of participants of the program.

For example, when a speaker gives a speech in the meeting, the detection module 320 may perform speech recognition (e.g., cognitive speaker detection) to identify a role (or an identification) of the speaker and a topic in the speech.

After detecting the speaker and/or identifying the topic in the speech by the detection module 320, the determination module 310 may deduce the current phase based on the phase context profile model. For example, based on the phase context profile model (e.g., the role speech meta), the determination module 210 may determine that the speaker always works in a specific phase, so as to deduce the specific phase as the current phase. For another example, based on the phase context profile model (e.g., the topic meta), determination module 210 may determine that the topic is always involved in a specific phase, so as to deduce the specific phase as the current phase.

Moreover, the determination module 310 may determine description, the responsibility, working duration, relationships (for example, co-workers), involved topics, working phases, edited files and documents, and/or the like, for the detected speaker based on the phase context profile model, as discussed above.

In some embodiments, the obtaining module 330 obtains meeting content associated with the meeting based on analyzing input data from the speaker.

The input data, for example, may comprise video transcripts, audio scripts, edited files, and/or the like. Variety of analysis technique can be utilized, such as acoustic analysis, semantic analysis, speech recognition, image interpretation and the like. By analyzing, the obtained meeting content may comprise, for example, involved events, topics, tasks, blocking issues, relationships of the tasks and blocking issues, program plans, related participants, and/or the like.

In an embodiment, the determination module 310 may also deduce the current phase based on the obtained meeting content along with the phase context profile model. For example, when a task is obtained by the obtaining module 330, the determination module 310 may determine that the task is always processed in a specific phase, so as to deduce the specific phase as the current phase.

In can be understood that, other determination method can be used to determine the current phase. For example, the meeting system may present a user interface (for example, via a dialog box) for a user (e.g., a host) in the meeting to input the current phase.

Furthermore, the meeting content obtained by the obtaining module 330 can be then used to activate and update corresponding files in combination with the activation module 340 and the updating module 350.

In some embodiments, the activations module 340 activates a file based on the current phase, the meeting content and the phase context profile model (and/or the phase context profile).

For example, the activations module 340 may retrieve a file corresponding to the role, the topic, or the like related to the obtained meeting content via the phase context profile model (e.g., the metadata). Then, the activation module 340 may activate the file and further activate a specific data unit in the file.

In another example, after identifying the speaker and based on the obtained meeting content, the activation module 240 may determine the phase context profile for the current phase, and then retrieve the corresponding local file based on determined phase context profile and the role, the topic, or the like related to the obtained meeting content. For example, based on the phase context profile in the above Case 2, if the determination module 310 determines that the current phase is phase 2, the detection module 320 detects the speaker being the role 12, and the topic matches keyword1 and keyword2, the activation module 240 may activate the corresponding files (file4 and doc2) automatically, as it predicts that the speaker is likely to update and correct the data in such files.

In some embodiments, the updating module 350 updates the file based on the meeting content.

For example, the updating module 250 may process (such as, dispatch, gather, map, combine, format) the meeting content into the corresponding data unit in the activated file. In an embodiment, when the meeting content indicates a status of a task (completed, pending, blocked, or the like), the updating module 350 may configure an indicator to the data unit associated with the task in the file to indicate the status of the task. For example, if the speaker talks about a task has been completed, the updating module 350 may automatically configure a complete indicator to the data unit associated with the task in the file.

In some embodiments, when the meeting content may indicate a relationship between a task and a blocking issue, the updating module 350 may configure an indicator to a data unit associated with the task in the file to indicate a status of the task based on the relationship between the task and the blocking issue. For example, the relationship may comprise whether the task is blocked by the blocking issue or the blocking issue is resolved and no longer block the task.

In an embodiment, the updating process can be implemented by using a companion reference model, which is configured to manage reference data of the file. For example, the indicator may be configured by sending an add reference event or a change reference event for the corresponding data unit via the companion reference model.

Figure 5:
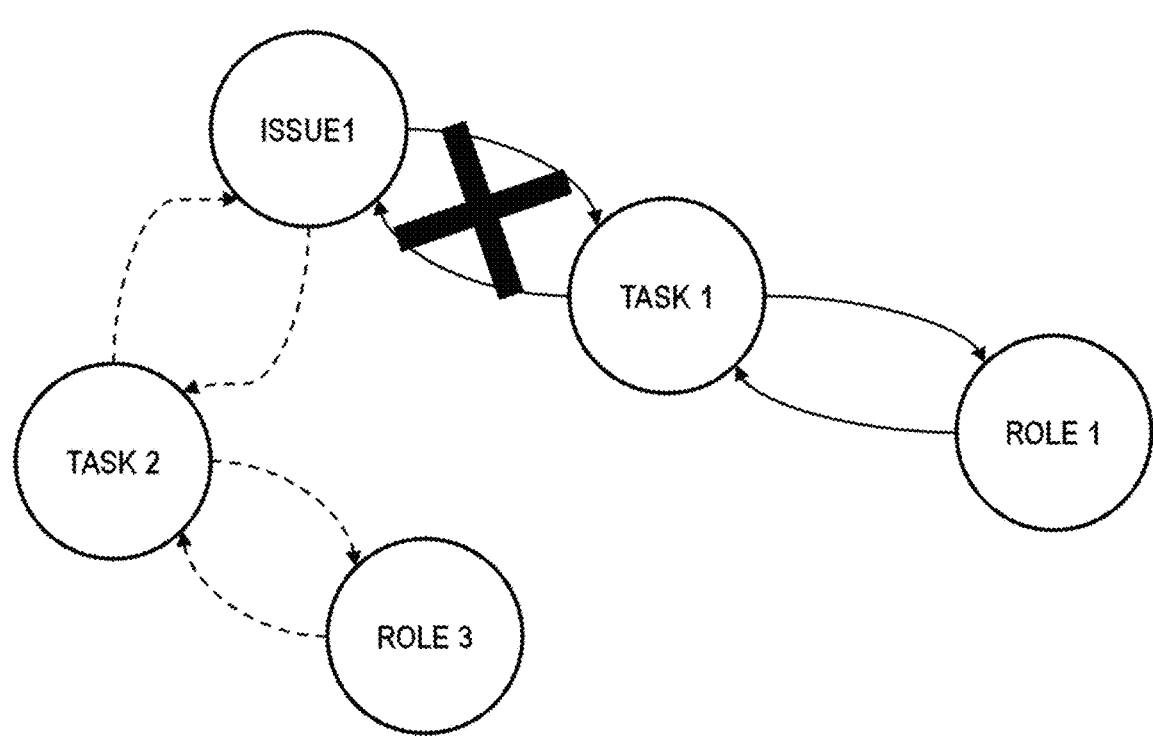
FIG. 5 shows an illustrative diagram for states among an issue, tasks and roles according to embodiments of the present disclosure.

For example, by listening to events in the speech of the speaker (e.g., Role 1), the obtaining module 330 may determine that a blocking issue (e.g., issue1) is blocking a task (e.g., task1) from moving forward. The activation module 340 may retrieve and activate the corresponding file based on the phase context profile module (or the phase context profile). The updating module 350 may then use the companion reference model to send an add reference event to update metadata of the file, to add an indicator to the data unit, indicating the task being blocked by the blocking issue. Therefore, the data unit corresponding to the task1 can be activated and updated to indicate that the task1 is blocked from moving forward. Any indicator for indicating the status of the task can be used, for example, by filling a red color in the data unit. An illustrative diagram for the states among the issue, task and role is depicted in FIG. 5, designated as 500, according to an illustrative embodiment of the present disclosure.

Further, by listening to the events in the speech of another speaker (e.g., Role 2), the obtaining module 330 may determine that the blocking issue (e.g., issue1) is resolved and no longer blocking the task (e.g., task1). As the corresponding file is activated by the activation module 340, the updating module 350 may use the companion reference model to send a change reference event to update metadata of the file, to correct the indicator to the data unit in the file, indicating the task not being blocked by the blocking issue. For example, a green color can be filled in the corresponding data unit. That is, when a state changing condition happens, the companion reference model can automatically manage the references by a change reference event. For example, as shown in FIG. 5, when the other speaker (e.g., Role 2) reports that the issue1 no longer blocks the task1, the corresponding data unit can be updated, and thus the connection between the issue1 and task1 can be removed, as marked by the cross mark.

Moreover, if another speaker (e.g., Role 3) talks that a task2 is depending on the issue1, the companion reference model can further update the corresponding data unit of task2. The updating result can be represented with the broken lines as shown in FIG. 5.

It can be understood that, during this process, the companion reference model can keep listening to the events in the following speeches of the following speakers, to update/maintain the metadata of the file. Therefore, the corresponding data unit in the file can be updated automatically. Other method for managing the reference to the metadata of the file can also be employed.

In another embodiment, the meeting content may indicate that a status of a task should be updated by a first participant of the plurality of participants who is absent from the meeting. The updating module 350 may retrieve information related to the task from history data associated with a previous meeting in which the first participant talked about the task. In response to retrieving the information related to the task, the updating module 350 may configure an indicator to the data unit in the file to indicate a status of the task based on the retrieved information. For example, in the previous meeting, the first participant said that he will miss the next meeting and will talk about the working process of the task in advance. Thus, based on the information about the task from the previous meeting, an indicator may be configured by using the companion reference model as discussed above.

Further, in response to not retrieving the information related to the task, the updating module 350 may determine a second participant of the plurality of participants (who can provide information related to the task in the meeting) based on the relationship among the plurality of participants (e.g., a co-worker, a leader, a group member, or the like, of the first participant), for example, from the phase context profile model (or the phase context profile). Then, the updating module 350 may cause the second participant to provide information related to the task, receive the information related to the task from the second participant, and configure an indicator to a data unit associated with the task in the file to indicate the status of the task based on the received information related to the task from the second participant.

For example, if the second participant is in the current meeting, the updating module 350 may generate a prompt (for example, by displaying an information on the user interface) to invite the second participant to provide the latest information of the task. For another example, if the second participant is also not in the current meeting, the updating module 350 may arrange the second participant to attend the current meeting to update the status of the task.

In some embodiments, the relationship among the plurality of participants can be indicated by a role map, which is generated by performing the phase context profile model as discussed above.

In addition, the role map (the relationship among the plurality of participants) may also be updated with respect to a topic of a speech of the speaker.

In some embodiments, the meeting content further indicates a relationship among at least some of the plurality of participants with respect to a topic of a speech of the speaker. Then, the role map may be updated via a work collaboration model based on the relationship among the at least some of the plurality of participants with respect to the topic of the speech of the speaker. The work collaboration model can be trained with history data associated with past meetings held for the program and the input data in terms of roles and topics, based on the relationship among the at least some of the plurality of participants with respect to the topic of the speech of the speaker.

FIG. 6 depicts an illustrative diagram of a process 600 for updating a role map based on the work collaboration model 601 according to an illustrative embodiment of the present disclosure. For example, the work collaboration model may be a deep neural network.

As shown in FIG. 6, the work collaboration model 601 may comprise a metadata analyzer 610, a context extractor block 620, a domain cluster 630 and a relationship discover unit 640. The metadata analyzer 610 can be configured to analyze metadata including both the history data and the input data from the speaker, such as, video transcript, audio script, related files, related topics for the past meetings and the current meeting. The context extractor block 620 can be configured to extract contexts and events (such as, related to roles, topics, tasks) from the analyzed metadata. The domain cluster 630 can be configured to perform domain clustering on the extracted contexts. The relationship discover unit 640 can be configured to discover the relationship among the participants in the program with respect to the specific topic/task.

At block 650, the role map for the current phase can be obtained based on the phase context profile model as discussed above. At block 660, the role map can be updated based on the relationship obtained from the work collaboration model 601, for example, with respect to the specific topic/task.

Therefore, as the relationship and responsibility of some participant may change with the progress of the program, the work collaboration model can automatically update the role map to reflect the relationship among the participants for different topics/tasks.

Figure 7:
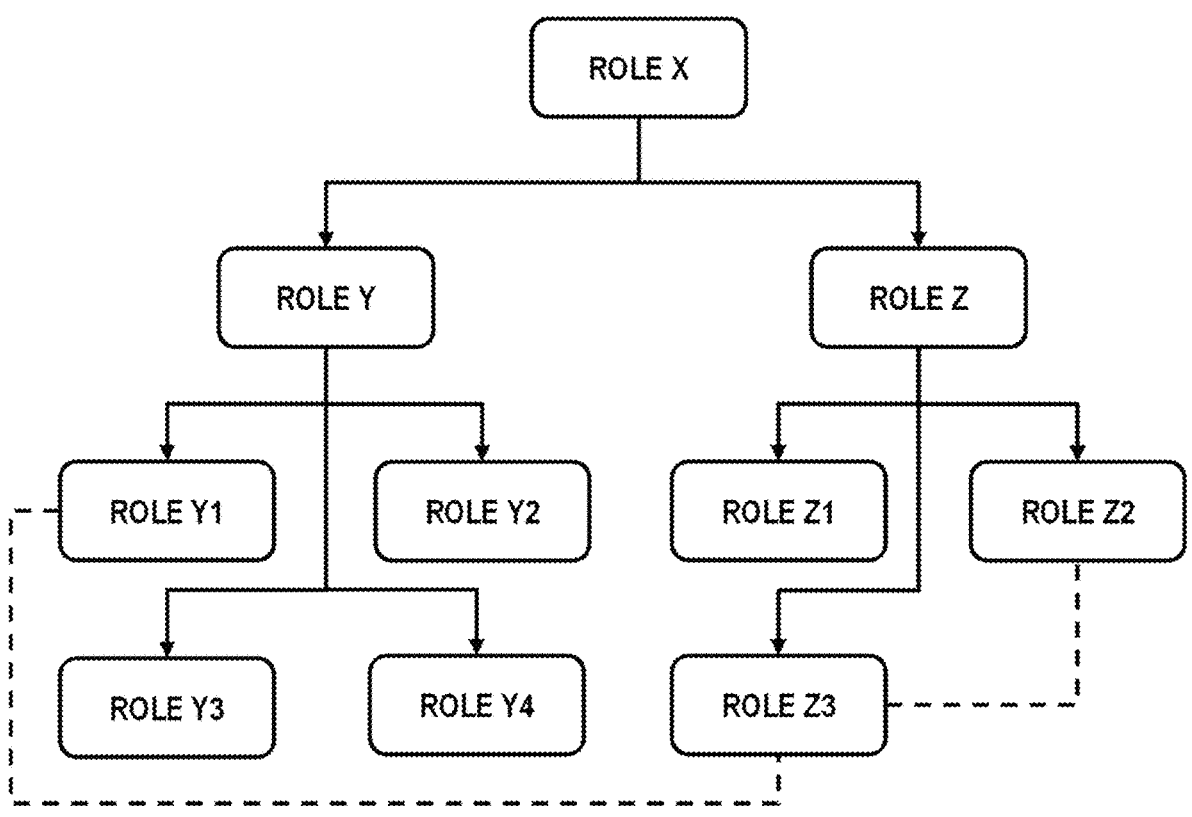
FIG. 7 shows an illustrative diagram of an exemplary role map according to embodiments of the present disclosure.

FIG. 7 depicts an illustrative diagram of an exemplary role map according to embodiments of the present disclosure. As shown in the role map, each node may represent a participant (also referred to as a role) in the program. The role with a highest level may be indicated with a root node, which connected to nodes indicating roles with lower level. As an example, the relationship indicated by solid lines can be obtained originally by the phase context profile model. Specifically, Role X (for example, a manager) has a higher level than Role Y and Role Z. Role Y leads a group of members (i.e., Group Y), including Role Y1, Role Y2, Role Y3 and Role Y4. Role Z leads another group of members (i.e., Group Z), including Role Z1, Role Z2 and Role Z3. Further, when the Role Z3 talks about he is working on a task along with Role Z2 in the same Group Z and Role Y1 in the other Group Y, the work collaboration model can update the role map to correct the relationship, such that by adding dashed lines between them, as shown.

Further, for the respective speakers in the meeting, the respective modules can perform the corresponding operations as discussed above, until all the speakers finish their updates. In addition, the updating module 350 may update the phase context profile model and/or the phase context profiles based on the input data from the respective speakers (and the updated files). The updated models and the updated files can be saved in the database 390.

Figure 8:
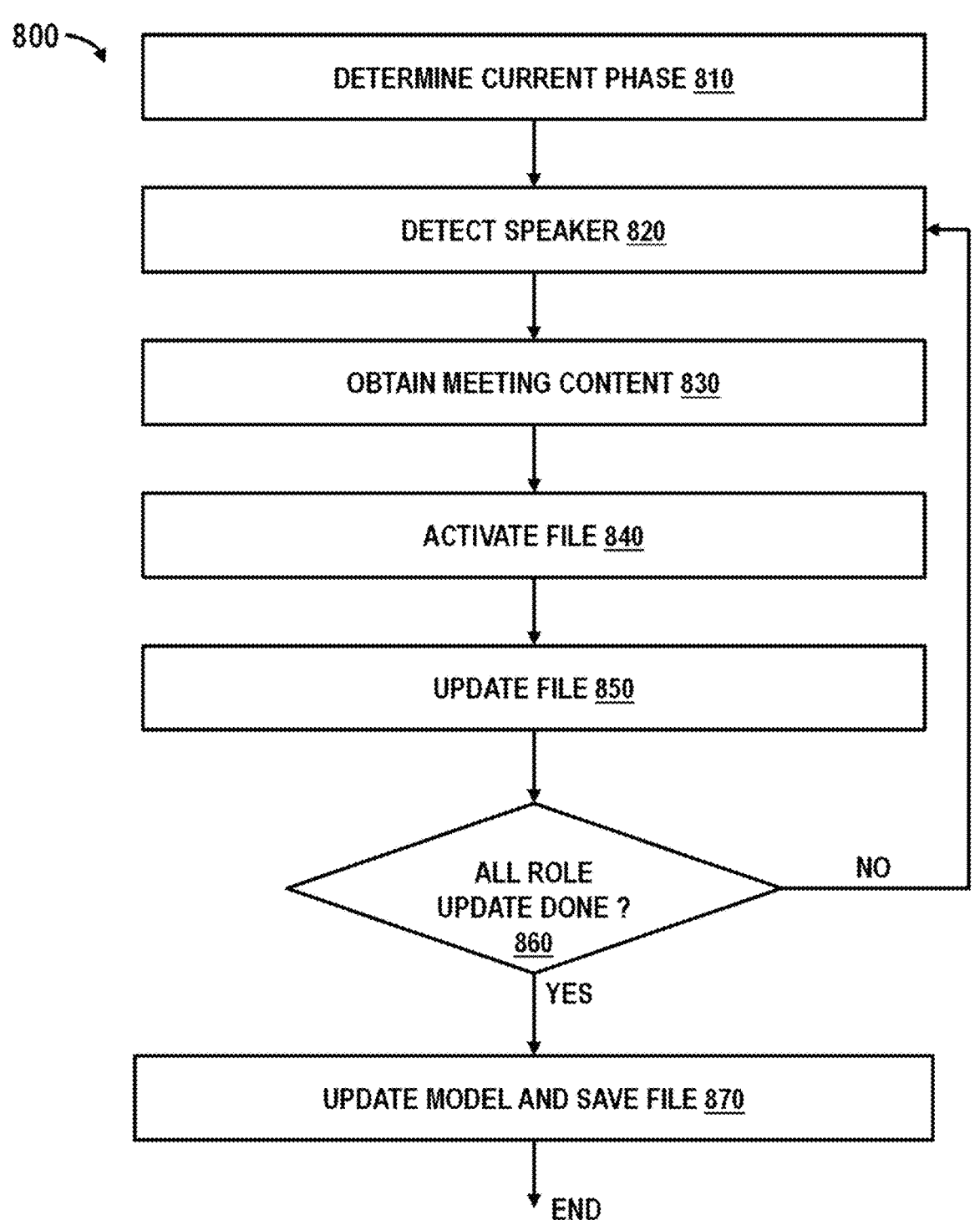
FIG. 8 shows a flowchart illustrating an exemplary process for adaptive derivation of meeting content according to embodiments of the present disclosure.

FIG. 8 depicts a flowchart illustrating an exemplary process for adaptive derivation of meeting content of a meeting held for a program according to embodiments of the present disclosure. In an illustrative embodiment, the process 800 could be implemented in the computing environment of FIG. 1, with reference to the meeting content processing system 210 as described above.

At block 810, the determination module 310 may determine, for the meeting, a current phase of a plurality of phases of the program, for example, by utilizing natural language processing based on program regular meeting agendas, program timelines, and/or the like, of the program or one or more similar programs. Moreover, the phase context profile model (as described above) can also be employed to determine the current phase.

At block 820, when a speaker gives a speech in the meeting, the detection module 320 may detect the speaker from a plurality of participants, for example, based on speech recognition techniques. In addition, a topic in the speech may also be detected by the detection module 320 based on speech recognition techniques.

At block 830, the obtaining module 330 may obtain meeting content by analyzing the input data from the speaker, via acoustic analysis, semantic analysis, speech recognition, image interpretation and the like. For example, the input data may comprise video transcripts, audio scripts, edited files, and/or the like. Moreover, the obtained meeting content may comprise, for example, involved events, topics, tasks, blocking issues, relationships of the tasks and blocking issues, program plans, related participants, and/or the like.

At block 840, the activation module 340 may activate a file based on the current phase, the meeting content and the phase context profile model. In addition, a phase context profile for the current phase can also be utilized to retrieve and activate the file.

At block 850, the updating module 350 may update the file based on the meeting content. For example, the meeting content can be processed (for example, dispatched, gathered, mapped, combined, formatted) into the corresponding data unit of the file. In an embodiment, a companion reference model can be configured to send an add reference event or a change reference event for the corresponding data unit to configure an indicator to the data unit to indicate a status of a task related to the meeting content. It can be understood that, the updating process can be performed in combination with the embodiments described above. Repeated details will not be elaborated.

At block 860, the determination module 310 may determine if all speakers finish their inputs or updates in the meeting. For example, the determination module 310 may determine who will give a speech in this meeting based on the program agendas and phase context profile. In addition, the determination module 310 may also determine who has already given a speech. If there are still members expecting to talk in the meeting, the process goes to block 820, to detect a next speaker. Therefore, the steps of speaker detection at block 820, meeting content obtaining at block 830, file activation at block 840 and file updating at block 850 can be repeated, until all speakers finish their inputs and updates.

Furthermore, at block 870, the updating module 350 may save the updated file, and additionally update the phase context profile model (and the phase context profile) based on the updated file, the meeting content, and/or the like.

It can be understood that, the embodiments of the present disclosure can be combined if there is no conflict. Repeated details will not be elaborated.

FIG. 9 depicts a schematic flowchart, designated as 900, illustrating a computer-implemented method for adaptive derivation of meeting content according to embodiments of the present disclosure.

It should be noted that the processing of adaptive derivation of meeting content according to the embodiments could be implemented in the computing environment of FIG. 1. For example, the method can be performed by a computing device, such as the processing circuitry 120.

As depicted in FIG. 9, at block 910, the computing device can determine, for a meeting held for a program, a current phase of the plurality of phases of the program.

In an embodiment, the current phase can be determined based on program regular meeting agendas and a program timeline, by performing a phase context profile model based on at least one of the followings: program regular meeting agendas, program timelines, input data from the speaker, and meeting contents. The phase context profile model can be trained with history data associated with past meetings held for the program in terms of roles, topics, file inputs and/or the like.

Therefore, the adaptive derivation of meeting content is an adaptive phase-sensitive derivation, thereby improving the accuracy and efficiency of the meeting content processing.

At block 920, the computing device can detect a speaker in the meeting from a plurality of participants of the program.

By detecting the speaker and additionally detecting a topic of speech of the speaker, the method can facilitate the derivation of the meeting content in terms of roles, topics and file inputs, based on the phase context profile model.

At block 930, the computing device can obtain meeting content associated with the meeting based on analyzing the input data from the speaker. For example, acoustic analysis, semantic analysis and image interpretation can be employed in this process.

In some embodiments, the input data may comprise video transcripts, audio scripts, edited files, and/or the like. Moreover, the obtained meeting content may indicate, for example, a status of a task (topic), a relationship between a task and a blocking issue, a status of a task should be updated by a first participant of the plurality of participants who is absent from the meeting. Therefore, the meeting content can be then used to activate and update the corresponding file to implement collaborative result fusion.

At block 940, the computing device can activate a file based on the current phase, the meeting content and the phase context profile model.

Additionally, the file can be retrieved and activated based on a phase context profile for the current phase, which can be determined based on the phase context profile model.

Therefore, the method can automatically retrieve and activate the file to be updated, thereby improving the efficiency of the meeting content derivation, avoiding losing track of important information of the meeting.

At block 950, the computing device can update the file based on the meeting content. For example, the meeting content can be processed (such as, dispatched, gathered, mapped, combined, formatted) to input to the activated file.

In an embodiment, the meeting content may indicate a relationship between a task and a blocking issue. The computing device can configure an indicator to a data unit associated with the task in the file to indicate a status of the task based on the relationship between the task and the blocking issue.

In an embodiment, the meeting content may indicate that a status of a task should be updated by a first participant of the plurality of participants who is absent from the meeting. The computing device can retrieve information related to the task from history data associated with a previous meeting in which the first participant talked about the task. In response to retrieving the information related to the task, the computing device can configure an indicator to a data unit associated with the task in the file to indicate the status of the task based on the retrieved information.

Moreover, in response to not retrieving the information related to the task, the computing device can determine a second participant of the plurality of participants based on a relationship among the plurality of participants. The computing device can cause the second participant to provide information related to the task. The computing device can receive the information related to the task from the second participant. Then, the computing device may configure an indicator to a data unit associated with the task in the file to indicate the status of the task based on the received information related to the task from the second participant.

Specifically, the indicator can be configured by sending an add reference event or a change reference event for the data unit via a companion reference model for managing reference data of the file. For example, the companion reference model can keep listening to the event of a speech of the speaker, and automatically update the data unit by sending an add reference event or a change reference event.

Therefore, the corresponding data unit in the file can be automatically updated to be in consistent with meeting content, facilitating efficient collaboration during the meeting and avoiding the loss of track of the important information.

In an embodiment, a relationship among the plurality of participants for the current phase can be indicated by a role map which is generated by performing the phase context profile model.

In a further embodiment, the meeting content may indicate a relationship among at least some of the plurality of participants with respect to a topic of a speech of the speaker. Then, the role map can be updated via a work collaboration model trained with history data associated with past meetings held for the program and the input data in terms of roles and topics, based on the relationship among the at least some of the plurality of participants with respect to the topic of the speech of the speaker. Therefore, a presentation of the relationships of the participants can be dynamically changed with the topic changing, facilitating the accuracy and efficiency of the meeting content derivation.

Based on the analysis, the method can quickly discover the relationships of the participants, the status of the tasks, the alternative participant for an absentee, and/or the like. Therefore, the participant in the meeting can get more comprehensive about the meeting, and easily track the meeting progress.

In some embodiments, the computing device may further repeat the detecting step 920, the analyzing step 930, the activating step 940 and the updating step 950 for the respective speakers until all of the speakers finish their speeches.

Therefore, collaborative result fusion can be achieved by adaptive phase-sensitive derivation, improving the efficiency of multi-role online meeting.

It can be noted that, the sequence of the blocks described in the above embodiments are merely for illustrative purposes. Any other appropriate sequences (including addition, deletion, and/or modification of at least one block) can also be implemented to realize the corresponding embodiments.

Additionally, in some embodiments of the present disclosure, a system for adaptive derivation of meeting content may be provided. The system may comprise one or more processors, a memory coupled to at least one of the one or more processors, and a set of computer program instructions stored in the memory. The set of computer program instructions may be executed by at least one of one or more processors to perform the above method.

In some other embodiments of the present disclosure, a computer program product for adaptive derivation of meeting content may be provided. The computer program product may comprise a computer readable storage medium having program instructions embodied therewith. The program instructions executable by one or more processors causes the one or more processors to perform the above method.

The present invention may be a system, a method, and/or a computer program product at any possible technical detail level of integration. The computer program product may include a computer readable storage medium (or media) having computer readable program instructions thereon for causing a processor to carry out aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a processing circuit, for a meeting held for a program, a current phase of a plurality of phases of the program;
   detecting, by the processing circuit, a speaker in the meeting from a plurality of participants of the program;
   obtaining, by the processing circuit, meeting content associated with the meeting based on analyzing input data from the speaker;
   activating, by the processing circuit, a file based on the current phase, the meeting content and a phase context profile model, which is trained with history data associated with past meetings held for the program in terms of file inputs and wherein the meeting content indicates a relationship between a task and blocking issue; and
   updating, by the processing circuit, the file based on the meeting content and wherein the updating the file based on the meeting content comprises:
      configuring, by the processing circuit, an indicator to a data unit associated with the task in the file to indicate a status of the task based on the relationship between the task and the blocking issue.

2. The computer-implemented method according to claim 1, wherein the current phase is determined by performing the phase context profile model based on at least one of the following:

program regular meeting agendas;

program timelines;

the input data from the speaker; and the meeting content.

3. The computer-implemented method according to claim 1, wherein the indicator is configured by sending an add reference event or a change reference event for the data unit via a companion reference model for managing reference data of the file.

4. The computer-implemented method according to claim 1, wherein the meeting content indicates that a status of a task should be updated by a first participant of the plurality of participants who is absent from the meeting;

wherein the updating the file based on the meeting content comprises:

retrieving, by the processing circuit, information related to the task from history data associated with a previous meeting in which the first participant talked about the task; and in response to retrieving the information related to the task, configuring, by the processing circuit, an indicator to a data unit associated with the task in the file to indicate the status of the task based on the retrieved information.

5. The computer-implemented method according to claim 4, wherein in response to not retrieving the information related to the task, the updating the file based on the meeting content further comprises:

determining, by the processing circuit, a second participant of the plurality of participants based on a relationship among the plurality of participants;

causing, by the processing circuit, the second participant to provide information related to the task;

receiving, by the processing circuit, the information related to the task from the second participant; and configuring, by the processing circuit, an indicator to a data unit associated with the task in the file to indicate the status of the task based on the received information related to the task from the second participant.

6. The computer-implemented method according to claim 1, wherein a relationship among the plurality of participants for the current phase is indicated by a role map which is generated by performing the phase context profile model.

7. The computer-implemented method according to claim 6, wherein the meeting content indicates a relationship among at least some of the plurality of participants with respect to a topic of a speech of the speaker;

wherein the role map is updated via a work collaboration model trained with history data associated with past meetings held for the program and the input data in terms of roles and topics, based on the relationship among the at least some of the plurality of participants with respect to the topic of the speech of the speaker.

8. The computer-implemented method according to claim 1, wherein a phase context profile for the current phase is determined based on the phase context profile model, wherein the file is activated further based on the phase context profile.

9. The computer-implemented method according to claim 1, further comprising:

updating, by the processing circuit, the phase context profile model based on the input data from the respective speakers in the meeting.

10. A system, comprising:

a processing circuit;

a memory coupled to the processing circuit; and a set of computer program instructions stored in the memory and executed by the processing circuit in order to perform actions of:

determining for a meeting held for a program, a current phase of a plurality of phases of the program;

detecting a speaker in the meeting from a plurality of participants of the program;

obtaining meeting content associated with the meeting based on analyzing input data from the speaker;

activating a file based on the current phase, the meeting content and a phase context profile model, which is trained with history data associated with past meetings held for the program in terms of file inputs and wherein the meeting content indicates a relationship between a task and a blocking issue; and updating the file based on the meeting content and wherein the updating the file based on the meeting content comprises:

configuring, by the processing circuit, an indicator to a data unit associated with the task in the file to indicate a status of the task based on the relationship between the task and the blocking issue.

11. The system according to claim 10, wherein the current phase is determined by performing the phase context profile model based on at least one of the following:

program regular meeting agendas;

program timelines;

the input data from the speaker; and the meeting content.

12. The system according to claim 10, wherein the indicator is configured by sending an add reference event or a change reference event to the data unit via a companion reference model for managing reference data of the file.

13. The system according to claim 10, wherein the meeting content indicates that a status of a task should be updated by a first participant of the plurality of participants who is absent from the meeting;

wherein the updating the file based on the meeting content comprises:

retrieving, by the processing circuit, information related to the task from history data associated with a previous meeting in which the first participant talked about the task; and in response to retrieving the information related to the task, configuring, by the processing circuit, an indicator to a data unit associated with the task in the file to indicate the status of the task based on the retrieved information.

14. The system according to claim 13, wherein in response to not retrieving the information related to the task, the updating the file based on the meeting content further comprises:

determining, by the processing circuit, a second participant of the plurality of participants based on a relationship among the plurality of participants;

causing, by the processing circuit, the second participant to provide information related to the task;

receiving, by the processing circuit, the information related to the task from the second participant; and configuring, by the processing circuit, an indicator to a data unit associated with the task in the file to indicate the status of the task based on the received information related to the task from the second participant.

15. The system according to claim 10, wherein a relationship among the plurality of participants for the current phase is indicated by a role map which is generated by performing the phase context profile model;

wherein the meeting content indicates a relationship among at least some of the plurality of participants with respect to a topic of a speech of the speaker;

wherein the role map is updated via a work collaboration model trained with history data associated with past meetings held for the program and the input data in terms of roles and topics, based on the relationship among the at least some of the plurality of participants with respect to the topic of the speech of the speaker.

16. A computer program product, comprising:

a computer readable storage medium readable by a processing circuit and storing instructions for execution by the processing circuit to perform actions of:

determining for a meeting held for a program, a current phase of a plurality of phases of the program;

detecting a speaker in the meeting from a plurality of participants of the program;

obtaining meeting content associated with the meeting based on analyzing input data from the speaker;

activating a file based on the current phase, the meeting content and a phase context profile model, which is trained with history data associated with past meetings held for the program in terms of file inputs and wherein the meeting content indicates a relationship between a task and a blocking issue; and updating the file based on the meeting content and wherein the updating the file based on the meeting content comprises:

configuring, by the processing circuit, an indicator to a data unit associated with the task in the file to indicate a status of the task based on the relationship between the task and the blocking issue.

17. The computer program product according to claim 16, wherein a relationship among the plurality of participants for the current phase is indicated by a role map which is generated by performing the phase context profile model;

wherein the meeting content indicates a relationship among at least some of the plurality of participants with respect to a topic of a speech of the speaker;

wherein the role map is updated via a work collaboration model trained with history data associated with past meetings held for the program and the input data in terms of roles and topics, based on the relationship among the at least some of the plurality of participants with respect to the topic of the speech of the speaker.

* * * * *